Figure 1:
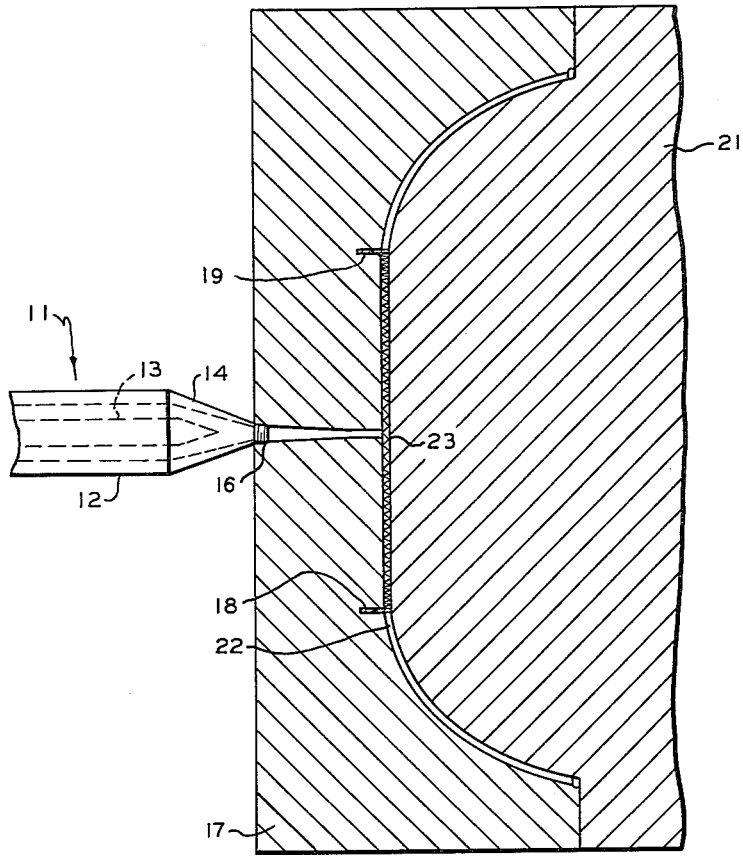

July 2, 1963    H. D. COALE    3,096,146
DECORATIVELY COLORED THERMOPLASTIC ARTICLE
AND PROCESS FOR MAKING THE SAME
Filed Feb. 16, 1961

INVENTOR.
H.D. COALE

BY *Hudson & Young*

ATTORNEYS

United States Patent Office 3,096,146
Patented July 2, 1963

3,096,146
DECORATIVELY COLORED THERMOPLASTIC
ARTICLE AND PROCESS FOR MAKING THE
SAME
Harold D. Coale, Bartlesville, Okla., assignor to Phillips
Petroleum Company, a corporation of Delaware
Filed Feb. 16, 1961, Ser. No. 89,742
9 Claims. (Cl. 18—61)

This invention relates to a process for injection molding thermoplastic resins. In one aspect it relates to a process for making a decoratively colored thermoplastic article by fusing colored thermoplastic inserts into the surface of the article as it is formed in particular patterns.

Extrudable and moldable plastics and resins are being formed into various types of thermoplastic containers, such as bowls, tumblers, pitchers, and the like. To enhance attractiveness of the resulting articles, designs and stripes are often desired to be added. The prior art teaches means for the affixing of designs, such as plastic decals, to molded articles. Also, striping may be effected by printing techniques. However, glued or fused decals, and printed designs are subject to destruction with handling, namely, by scraping, abrading, and dissolution. Nor can distinct striping be achieved by blending the pigmented resin with the major resin and subsequent injection molding of the blended resin melt.

Another desirable feature in thermoplastic articles is to selectively pigment one side or certain sections of an article rather than coloring the entire plastic material itself. This also cannot be achieved by prior art techniques of preblending the pigmented resin with the major resin from which the articles are to be molded.

Accordingly, it is an object of this invention to provide a method of making decoratively but durably striped thermoplastic articles. Another object is to provide a method of selectively diffusing a colored thermoplastic insert into the surface of an injection molded article as it is being formed. An additional object is to provide a novel procedure for injection molding decoratively pin striped thermoplastic articles. A still further object is to provide a method for coloring one side or certain sections of thermoplastic articles.

Other objects of the invention will become apparent on consideration of the accompanying disclosure.

Broadly, the invention comprises providing means for positioning a thermoplastic insert in the mold cavity about the injection point of the mold cavity. In one embodiment, a groove in the mold which is provided to form the supporting ridge of the finished article may be readily employed for this purpose. The insert itself has been preformed in the shape of a rectangular strip or a flat circular band before placing it in the indicated recess. The insert is also provided with at least one intended or serrated edge having a plurality of points, such as is achieved with pinking shears, though this pinking may more conveniently be done by a machine. The serrated insert is placed in indicated recess with the serrated edge projecting into the main portion of the mold cavity, that is, surrounding the inlet orifice of the mold. The apexes of the pinked strip protrude out of the rim recess to a carefully controlled degree. In this manner, the molten polymer softens the pigmented thermoplastic insert and draws colored resin from the points on the pinked edge, resulting in pin stripes extending to what will be the lip of the finished article. This decorative striping technique does not slow down the production rate of the articles, and results in their incorporating a decoration that is attractive, unique, and permanent. Any desired spacing and number of stripes can be incorporated into the resulting article merely by varying the frequency per unit length of the indentations in the pinked edge.

Figure 3:
Figure 2:
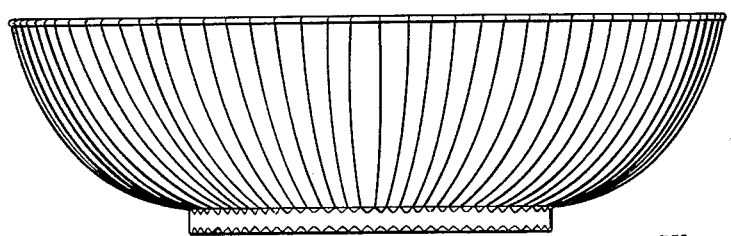

A more complete understanding of the invention may be had by referring to the accompanying schematic drawing, wherein like parts have been designated with like reference numerals, of which FIGURE 1 is an isometric view in full section of an arrangement of an apparatus for extruding and injection molding in accordance with the invention; FIGURE 2 is a finished salad bowl made according to this invention. FIGURE 3 is a coloring insert of different design.

Referring to FIGURE 1, an injection molding machine 11 comprises a hollow main body 12, a torpedo 13 spacedly and rigidly disposed within the wall of body 12, and a nozzle 14. Nozzle 14 threads into the external end of sprue 16 which is centrally disposed through the body of an outer mold half 17. Outer mold half 17 is provided with a circular groove or rim cavity 18 which forms the supporting rim or ridge of the finished article. Groove 18 may be employed according to this invention as the receptacle for the insert 19 which comprises a rectangular strip or preformed circular band of a pigmented thermal plastic material. Spacedly disposed from and within outer mold half 17 is inner mold half 21. When mold halves 17 and 21 are in the closed position they form a mold cavity 22 having the shape of the article to be injection molded. It should be noted that thermoplastic insert 19 has a serrated or "pinked" edge, with the apexes thereof, such as 23, protruding slightly out of groove 18, to perhaps a height of $\frac{1}{16}$ of an inch. This height for the apexes 23 results in a pin striped effect in the surface of the finished article as depicted in FIGURE 2.

The resulting injection molded thermoplastic article is shown as a salad bowl in this specific embodiment, although a variety of molded articles can be decoratively pin striped in the same manner merely by employing molds of different configurations. Whatever the particular shape of the article, according to this invention, it will be provided with a decoratively pin striped surface comprising a plurality of approximately parallel lines, having a geometry like that of the meridianal lines on the globe originating from an actual center point or from a circular thermoplastic insert disposed about such a center point. These pin stripes or lines are fused into the surface of the finished article, as is the insert from which they originated. The insert itself is specifically bonded to the supporting ridge or rim of the article. In another embodiment, as depicted in FIGURE 3, the serration of the insert comprises rectangular indentations which will result in broad, rather than pin, stripes in the article.

All types of plastics and resins which are amenable to extrusion and molding may be provided with pin stripes in accordance with the invention. The resin forming the main body of the article may be the same as or a different resin than the resin from which the pin stripes are made. However, it is necessary that the resins are compatible with each other and join in the melt to form a uniform surface.

Resins particularly suitable for extrusion and injection molding in accordance with the invention are the high density polyolefins made in accordance with the Hogan and Banks patent, No. 2,825,712, issued March 4, 1958. This family of polyolefins are of higher density than ordinary high pressure polyolefins. To illustrate, polyethylene of this type has a density of 0.960 to 0.980 as compared with high pressure polyethylene which has a density of about 0.920. Even when copolymerized with minor amounts of other olefins, such as 1-butene, the density of the ethylene copolymer is above 0.940. However, the invention is applicable to all types of extrudable and moldable thermoplastic resins, such as polystyrene and poly vinylchloride.

The thickness of the serrated or pinked insert is important, and will be varied with the wall thickness of the article to be formed. If the insert is too thick, the pin stripe effect will appear on both the inside and outside of the molded article. If the insert thickness is correctly chosen, then the striping will appear only on the outside of the bowl. Moreover, the width of the insert is also important. If the apexes of the serrated stripe protrude too far out of the mold groove or rim cavity, the result is a "blur" of the striping. Also, the stripes will run over the lip of the bowl and start back down on the inside surface. On the other hand, if the apexes of the insert are not high enough, the pin stripes will not reach the lip of the bowl. If the edge protrusion is correct, a distinct pin stripe running to the lip only will result.

In operation, the pelleted thermoplastic resin, which is to form the thermoplastic article proper, is fed into the hopper end (not shown) of the injection molding machine 11. A piston (also not shown) is disposed within molder 11 upstream of the hopper, and periodically moves a fixed distance towards nozzle 14 upon being actuated, usually automatically. The pellets are fused into a polymer melt by heaters (not shown) disposed within the walls of molding machine 11, downstream of the hopper. A measured quantity of pelleted polymer is added to the hopper article prior to movement of the piston. This amount of pelleted resin is approximately the volume of the mold cavity when closed. In this manner, the piston will extrude an identical amount of polymer melt into sprue 16, with each cycle of operation. The pigmented thermoplastic inserts were formed from black 40 mil sheets by cutting it into strips with pinking shears. The length of the strip was cut to the circumferential length of the mold groove or cavity that forms the supporting ridge of the bowl.

With the mold halves in the open position, a preformed colored, serrated, thermoplastic insert is placed in the rim cavity or mold groove with the pinked edge protruding slightly beyond the groove. The mold is then closed, and the piston moves forward causing a fixed volume of the hot flowing thermoplastic material to slowly pass through nozzle 14, sprue 16, and into mold cavity 22, soon completely filling the same. The injected thermoplastic material intimately contacts and fuses the pigmented, serrated insert 19, drawing from the plurality of apexes thereof a minor part of said colored thermoplastic. This continues so long as the injected material is filling the mold cavity and is flowing past the insert. When the mold cavity is filled, the remainder of the insert becomes fusion bonded by the heat of the injected stock into the supporting ridge of the formed article. A serrated edge, if one exists, on the bottom of the insert apparently aids in fusing the insert to the base of the article. The result is a decoratively striped, injection molded, thermoplastic article.

Example

A mold comprising two complementary halves was prepared by methods well known in the art for a salad bowl of an 11-inch diameter as measured at its lip. The width of the mold cavity averaged 1/16 of an inch (62.5 mils). The pigmented thermoplastic insert was cut in rectangular form from a 40 mil thick sheet of carbon black pigmented high density polyethylene, with dimensions of 3/8 of an inch by 17.3 inches. In this manner the strip will completely fill the rim cavity having a diameter of about 5½ inches, which forms the supporting ridge of the finished bowl. The rectangular insert was first serrated on both long edges with pinking shears, and then positioned in the rim cavity. The rim cavity was of a depth so that the serrated edge protruded into the main mold cavity about 1/16 of an inch. A pin striped salad bowl was then formed as indicated in the foregoing description.

In another embodiment of this invention, the novel method can be employed to pigment only one portion of the resulting thermoplastic article. Also, coloring of one or more sections on one or both sides of the articles can be accomplished by the present invention. This is achieved by forming the pigmented insert as previously described, but omitting the step of serrating its edges which results in stripes of varying width and frequency. By carefully controlling the insert thickness and extent of protrusion of the insert into the main portion of the mold cavity, a uniformly colored surface can be effected in either side of the article. The side which is colored can be readily chosen by position of the insert relative to the mold halves. Moreover, the segmenting of the insert before positioning can result in an article which is colored in sections of only one face.

In the situation where a circular groove or rim cavity is lacking in either of the mold halves, or where it is not desirable to specially groove the mold to accommodate the colored insert, an alternative method of positioning the insert may be employed. The pigmented insert may be first formed into a continuous circular band. It is further provided with ribs, like the spokes of a wheel, to maintain the band in its preformed position when the flowing polymer melt is exerting pressure against it. The reinforced band is centered about the injection point and may be retained in its initial position by straight grooves in the face of the mold which are coincident with one or more of the ribs of the insert when the latter is properly centered about the injection point.

Another embodiment would be to provide one mold half with a generally circular groove about the injection point, but have the groove describe a continuous sinusoid. In this manner, a finished article would result having its pin stripes emanating from a supporting ridge of a wavy design rather than a perfectly circular support, giving still another desirable decorative effect.

Certain modifications of the invention will become apparent to those skilled in the art and the illustrative details disclosed are not to be construed as imposing unnecessary limitations on the invention.

I claim:

1. The process for molding a thermoplastic article having at least one decorated surface which comprises: forming at least one insert of a colored thermoplastic; securely positioning said insert within a mold cavity about the injection orifice thereof; filling said mold cavity through said injection orifice while in the closed position with a thermoplastic material from a hot plastic mass thereof, said injected thermoplastic material contacting and softening said insert; thereby drawing from one edge of said insert a minor part of said colored thermoplastic until said injected material fills said mold cavity and ceases to flow thereinto; whereby a decorated injection molded article is formed.

2. The process of claim 1 wherein said thermoplastic material is high density polyethylene.

3. The process of claim 1 wherein said insert has the configuration of a rectangular strip.

4. The process of claim 1 wherein said insert has the configuration of a flat circular band.

5. The process of claim 1 wherein a groove is provided in said mold surface centered about said injection orifice to provide a receptacle for said insert.

6. The process for molding a thermoplastic article having a decoratively striped surface which comprises: forming an insert of a colored thermoplastic having at least one serrated edge; securely positioning said insert within a mold cavity about the injection orifice thereof; filling said mold cavity while in the closed position with a thermoplastic material from a hot plastic mass thereof, said injected thermoplastic material contacting and softening said insert; thereby drawing from the plurality of points thereof a minor part of said colored thermoplastic until said injected material fills said mold cavity and ceases to flow thereinto; whereby a decoratively striped injection molded article is formed.

7. In the process of claim 6, the method of controlling the spacing of the stripes in said thermoplastic article comprising varying the frequency per unit length of the indentations in the serrated edge of said insert.

8. The process for molding a thermoplastic article having a decoratively striped surface when comprises: forming an insert of a colored thermoplastic having at least one serrated edge; placing said insert in a groove provided in at least one internal surface of a mold cavity near the injection orifice thereof; filling said mold cavity while in the closed position with a thermoplastic material from a hot palstic mass thereof, said injected thermoplastic material contacting and melting said insert; thereby drawing from the plurality of points thereof a minor part of said colored thermoplastic until said injected material fills said mold cavity and ceases to flow thereinto; whereby there is formed a decoratively striped injection molded article.

9. A molded thermoplastic bowl having a decoratively striped surface manufactured by: forming at least one insert of a colored thermoplastic having at least one serrated edge; securely positioning said insert within a mold cavity about the injection orifice thereof; filling said mold cavity through said injection orifice while in the closed position with a thermoplastic material from a hot plastic mass thereof, said injected thermoplastic material contacting and softening said insert, thereby drawing from one edge of said insert a minor part of said colored thermoplastic until said injected material fills said mold cavity and ceases to flow thereinto; whereby said decoratively stripped thermoplastic bowl is formed.

References Cited in the file of this patent

UNITED STATES PATENTS

| | | |
|---|---|---|
| 649,888 | Cook | May 15, 1900 |
| 2,174,779 | Delorme | Oct. 3, 1939 |
| 2,233,987 | Orsini | Mar. 4, 1941 |
| 2,334,307 | Bauer | Nov. 16, 1943 |
| 2,485,323 | Schwartz | Oct. 18, 1949 |